US011350737B2

(12) United States Patent
Swetharanyam et al.

(10) Patent No.: US 11,350,737 B2
(45) Date of Patent: Jun. 7, 2022

(54) PICK-UP DEVICE AND A METHOD FOR CONTROLLING A BRAKE ACTING ON A HEIGHT-ADJUSTABLE PICK-UP UNIT OF A PICK-UP DEVICE

(71) Applicant: RealThingks GmbH, Meerbusch (DE)

(72) Inventors: Sugandar Swetharanyam, Meerbusch (DE); Peter Jakobsson, Meerbusch (DE)

(73) Assignee: REALTHINGKS GMBH, Meerbusch (DE)

( * ) Notice: Subject to any disclaimer, the term of this patent is extended or adjusted under 35 U.S.C. 154(b) by 0 days.

(21) Appl. No.: 17/119,146

(22) Filed: Dec. 11, 2020

(65) Prior Publication Data

US 2021/0259403 A1    Aug. 26, 2021

(30) Foreign Application Priority Data

Feb. 20, 2020    (EP) .................................... 20158380

(51) Int. Cl.
| | | |
|---|---|---|
| *A47B 9/20* | (2006.01) | |
| *A47B 21/02* | (2006.01) | |
| *F16D 63/00* | (2006.01) | |

(52) U.S. Cl.
CPC ............... *A47B 9/20* (2013.01); *A47B 21/02* (2013.01); *A47B 2200/0051* (2013.01); *A47B 2200/0062* (2013.01); *A47B 2220/0002* (2013.01); *F16D 63/006* (2013.01)

(58) Field of Classification Search
CPC ................ A47B 9/10; A47B 9/00; A47C 3/30
USPC ........................................ 108/147; 248/188.2
See application file for complete search history.

(56) References Cited

U.S. PATENT DOCUMENTS

| | | | | |
|---|---|---|---|---|
| 8,276,526 | B2 * | 10/2012 | Verweij | A47B 9/20 108/147 |
| 9,084,475 | B2 * | 7/2015 | Hjelm | H02J 3/007 |
| 10,213,015 | B1 * | 2/2019 | Anderson | A47B 13/02 |
| 10,258,150 | B2 * | 4/2019 | Lin | A47B 13/02 |
| 10,405,647 | B2 * | 9/2019 | Laudadio | F16M 11/18 |
| 10,617,201 | B2 * | 4/2020 | Smed | G05B 19/416 |
| 10,912,380 | B1 * | 2/2021 | Lu | G01P 13/00 |
| 11,064,911 | B2 * | 7/2021 | Panneer Selvam | A61B 5/6891 |
| 2005/0187712 | A1 * | 8/2005 | Callaghan | B66B 5/0031 701/301 |
| 2016/0051042 | A1 * | 2/2016 | Koch | H02K 11/40 248/550 |
| 2016/0135587 | A1 * | 5/2016 | Satou | A47B 9/10 108/143 |
| 2016/0170402 | A1 * | 6/2016 | Lindstrom | A47B 21/02 700/275 |

(Continued)

FOREIGN PATENT DOCUMENTS

| | | |
|---|---|---|
| EP | 0948918 A2 | 10/1999 |
| WO | 2006087210 A1 | 8/2006 |
| WO | 2020083827 A1 | 4/2020 |

OTHER PUBLICATIONS

"European Search Report for European Patent Application No. 20158380.4", dated Jun. 26, 2020, 6 Pages.

*Primary Examiner* — Jose V Chen
(74) *Attorney, Agent, or Firm* — Calfee, Halter & Griswold LLP

(57) ABSTRACT

The invention relates to a pick-up device with a height-adjustable pick-up unit and at least one gas pressure spring designed to compensate for forces acting on the holding unit.

17 Claims, 4 Drawing Sheets

(56) References Cited

U.S. PATENT DOCUMENTS

Figure 1:
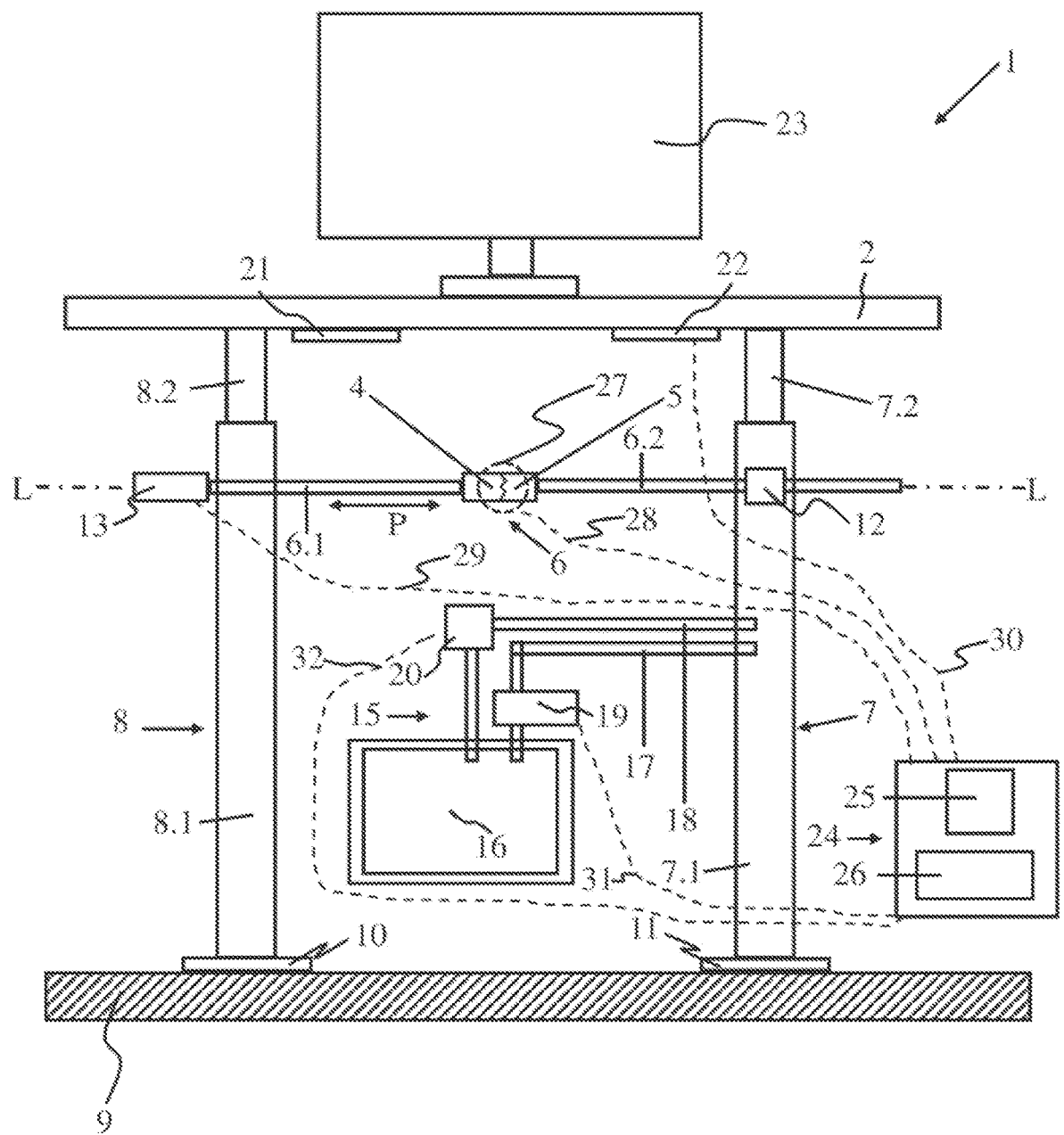

| | | | |
|---|---|---|---|
| 2016/0260019 A1* | 9/2016 | Riquelme Ruiz | A47B 95/00 |
| 2016/0353880 A1* | 12/2016 | Sigal | G06Q 10/00 |
| 2016/0360878 A1* | 12/2016 | Hansen | A47B 9/10 |
| 2017/0052517 A1* | 2/2017 | Tsai | A47B 9/00 |
| 2018/0000240 A1* | 1/2018 | Yamamoto | A47B 9/00 |
| 2018/0020831 A1* | 1/2018 | Lenz | A47C 3/20 |
| | | | 297/174 R |
| 2018/0064241 A1* | 3/2018 | Tseng | F15B 15/1409 |
| 2018/0120790 A1* | 5/2018 | Hansen | G05B 19/0423 |
| 2018/0279769 A1* | 10/2018 | Zheng | A47B 21/02 |
| 2019/0029412 A1* | 1/2019 | Gibson | A47B 21/02 |
| 2019/0223586 A1* | 7/2019 | Hansen | A47C 3/20 |
| 2019/0252903 A1* | 8/2019 | Lukas | H02J 7/0042 |
| 2019/0298055 A1* | 10/2019 | Yamamoto | A47B 9/20 |
| 2019/0328128 A1* | 10/2019 | Namala | A47B 9/16 |
| 2019/0343271 A1* | 11/2019 | Hille | A47C 20/041 |
| 2020/0093259 A1* | 3/2020 | Verhappen | A47B 9/14 |
| 2020/0104762 A1* | 4/2020 | Gibson | A47C 7/72 |
| 2020/0136551 A1* | 4/2020 | Liu | A47B 9/00 |
| 2020/0329860 A1* | 10/2020 | Xiang | A47B 13/02 |
| 2020/0329861 A1* | 10/2020 | Zhang | A47B 9/00 |
| 2020/0337451 A1* | 10/2020 | Tao | A47B 9/12 |
| 2021/0100353 A1* | 4/2021 | Olesen | G05B 19/045 |
| 2021/0100354 A1* | 4/2021 | Moller | A47B 9/20 |

\* cited by examiner

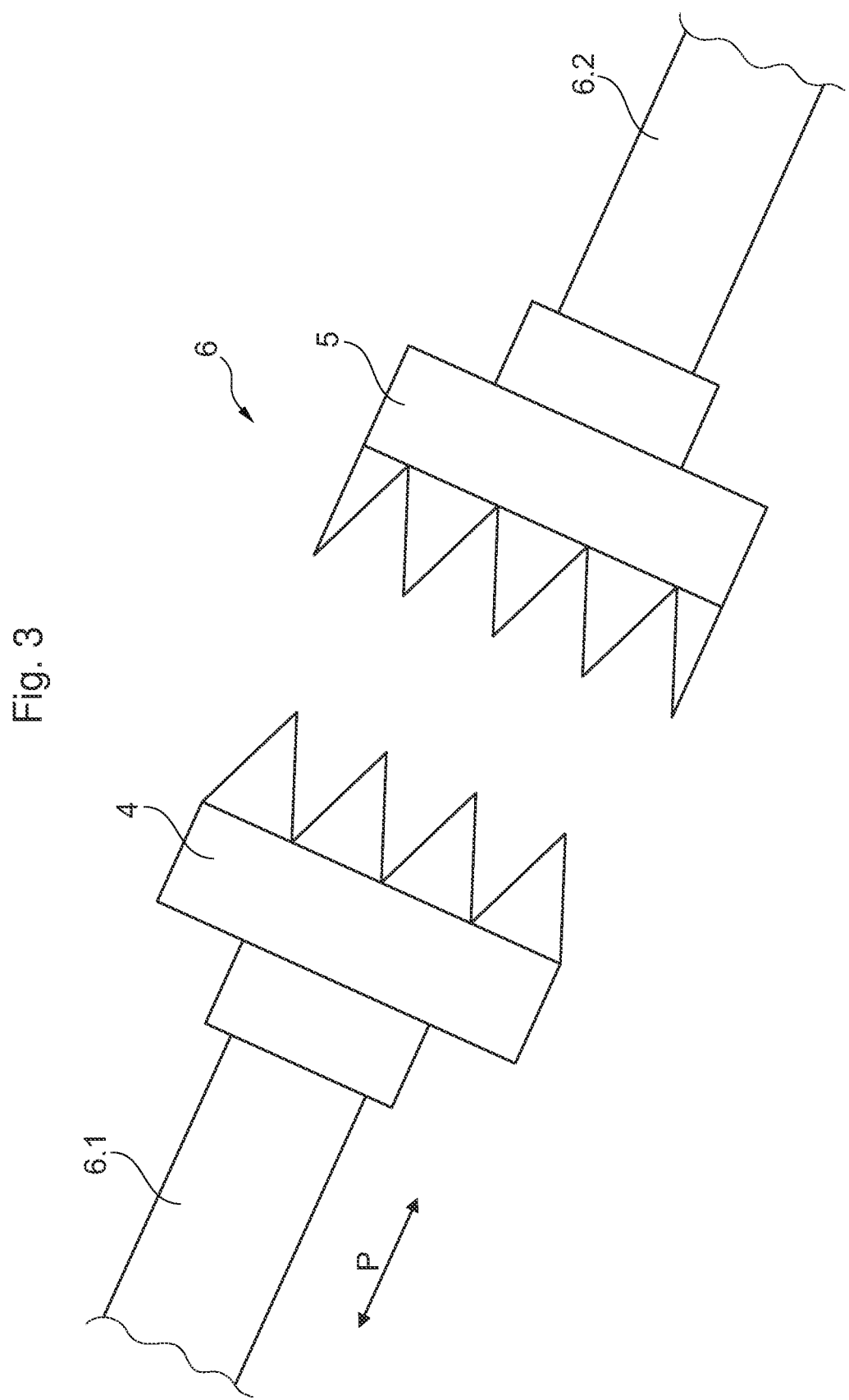

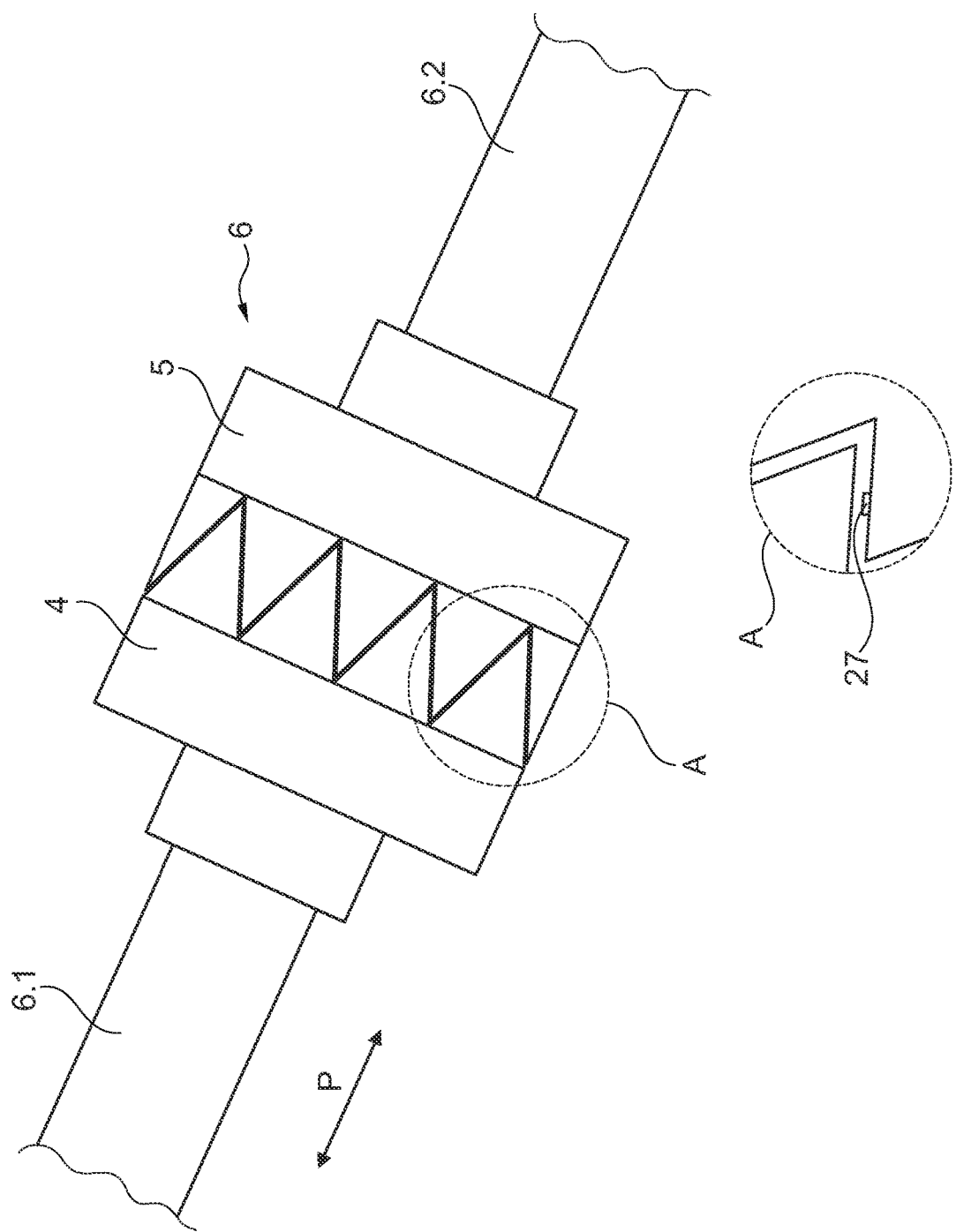

PICK-UP DEVICE AND A METHOD FOR CONTROLLING A BRAKE ACTING ON A HEIGHT-ADJUSTABLE PICK-UP UNIT OF A PICK-UP DEVICE

The invention relates to a pick-up device and a method for controlling a brake acting on a height-adjustable pick-up unit of a pick-up device.

A pick-up device serves to pick up objects in order to be able to provide them at different heights. A pick-up device has a pick-up unit for picking up objects. The pick-up unit is designed to pick up objects, for example by allowing the objects to be placed on the pick-up unit or arranged on it in some other way, e.g. it can also be attached to it. Such a pick-up device may be a table, for example, so that the pick-up unit is a height-adjustable table top. Objects in the form of books, computers, etc. can be placed on the tabletop.

The height adjustability of the pick-up unit of such a pick-up device may be desired, for example, in order to be able to make objects placed on the pick-up unit available at different heights, for example because these objects are to be made available at different heights to another unit or because a user of the pick-up device would like to have the objects on the pick-up unit available at different heights. The latter may be desired for ergonomic reasons, for example. In addition, the height adjustability of a pick-up unit may be desired, for example, because a user of the pick-up unit wishes to access the objects arranged on the pick-up unit, on the one hand, while sitting and, on the other hand, while standing.

To be able to provide the pick-up unit of such pick-up devices in a height-adjustable manner, it is known from the state of the art to use gas pressure springs. Such gas pressure springs provide spring forces acting on the pick-up unit in such a way that forces acting on the pick-up unit, in particular weight forces, can be balanced in such a way that the pick-up unit can be provided at different heights. As a rule, corresponding gas pressure springs are arranged between the pick-up unit and the base on which the pick-up device is arranged, so that the gas pressure springs counteract the gravitational force acting on the pick-up unit with their spring force. According to the state of the art, such gas pressure springs provide a fixed spring force which is designed for an expected weight force of the pick-up unit. As a rule, the level of the spring force of the gas pressure spring is dimensioned in such a way that it compensates for the gravitational force of the pick-up unit, so that the pick-up unit can be kept in "balance" by the gas pressure spring or a balance can be achieved with regard to the weight force of the pick-up unit and the spring force of the gas pressure spring.

In order to be able to lock the height-adjustable pick-up unit of such pick-up devices at a desired height, such pick-up devices may, in accordance with the state of the art, have a brake by which the pick-up unit can be locked at a desired height. In this respect, the pick-up unit can be kept in balance at a desired height, in particular by means of the spring forces acting on the pick-up unit through the gas pressure spring, and then locked at this height by the brake.

If the weight force of the pick-up unit is changed during the locking of the brake, for example by removing objects from the pick-up unit or by placing further objects on the pick-up unit, this can lead to the weight force of the pick-up unit and the spring force of the gas pressure spring no longer being in balance. After releasing the brake, however, this circumstance can lead to the fact that the spring force acting through the gas pressure spring on the pick-up unit is either too great or too small to keep the pick-up unit in balance. If the weight of the pick-up unit is increased by adding other objects to the pick-up unit, this may result in the spring force being too low to keep the pick-up unit balanced, so that the pick-up unit moves downwards after the brake is released. Conversely, removing objects from the pickup unit may cause the pickup unit to move up when the brake is released. This means that the pick-up unit can no longer be made available at the desired height, for example. In extreme cases, this can also mean that the pick-up unit can no longer be adjusted to a desired height by a user of the pick-up device. For example, such an undesired height adjustment of the pick-up unit after releasing the brake can also lead to a user of the pick-up unit being injured by a pick-up unit moving up or down.

It is an object of the invention to provide a pick-up device which does not have the aforementioned disadvantages. In particular, it is an object of the invention to provide a pick-up device with which an undesired height adjustment of the pick-up unit can be prevented after releasing a brake. In particular, it is an object of the invention to provide a pick-up device with which the injury to the user of the pick-up device can be prevented after the brake is released, insofar as the forces acting on the pick-up unit, in particular also the weight acting on the pick-up unit, have changed during the locking of the brake.

It is a further object of the invention to provide a method for operating such a pick-up device.

In accordance with the invention, to solve the object, a pick-up device is provided, comprising:

A height-adjustable pick-up unit;
at least one gas pressure spring which is designed to compensate for forces acting on the pick-up unit;
a brake which is designed to take up a first position and a second position, wherein the brake in the first position locks the pick-up unit in such a way that the pick-up unit is not height-adjustable, and the brake in the second position does not lock the pick-up unit so that the pick-up unit is height-adjustable;
a sensor by means of which a measured variable can be determined which can be changed by forces acting on the pick-up unit when the brake takes up the first position;
control means by which the brake can be actuated to take up the first position or the second position, the control means being set up in such a way that the brake can be actuated by the control means as a function of the measured variable which can be determined by the sensor.

Furthermore, the subject of the invention is a method for controlling a brake acting on a height-adjustable pick-up unit of a pick-up device, comprising the following features:
Providing of the pick-up device disclosed herein;
activating of the brake by the control means.

In accordance with the invention, it was recognised that a pick-up device of the generic type which solves the aforementioned objects can be provided if it comprises a sensor by means of which a measured variable can be determined which can be changed by forces acting on the pick-up unit when the brake takes up the first position. This makes it possible, even when the brake is locked, to determine the forces acting on the pick-up unit, in particular the weight force acting on the pick-up unit, and to operate the pick-up device in dependence thereon. In concrete terms, the pick-up device can be operated by means of such a sensor in accordance with the invention in such a way that the brake can be controlled as a function of the measured variable determined by the sensor.

According to the invention, control means are provided for controlling the brake, by which the brake can be controlled to take up the first position or the second position. According to a core idea of the invention, the control means are now set up in such a way that the brake can be controlled by the control means depending on the measured variable determined by the sensor. In particular, this also makes it possible to control the control means in such a way that they only move the brake into the second position as a function of the measured variable, in which the pick-up unit is height-adjustable.

While the brake is locked, objects can be placed on the pick-up unit, for example. As a result, the weight force acting on the pick-up unit changes and thus also the measured variable determined by the sensor. The brake is then only transferred to the second position by the control means depending on this measured variable which can be determined by the sensor.

Furthermore, according to the invention, it was recognised that it is advantageous if a measured variable can be determined by the sensor when the brake is in the first position, i.e. the pick-up unit is locked. This is especially true if the forces acting on the pick-up unit have changed when the brake is locked. The height of the pick-up unit can only be adjusted if the brake has been transferred to the second position by means of the control means. According to the invention, the brake is controlled by the control means depending on the measured value determined by the sensor.

In particular, special preference may be given to the design of the pick-up device in such a way that the brake can only be transferred to the second position by the control means when the pick-up unit is in balance. Balance means that a spring force of the at least one gas pressure spring compensates the weight force acting against it. The weight force is composed in particular of the acting weight forces of the pick-up unit itself, the objects arranged on or at the pick-up unit and, if necessary, further components of the receptacle device (as specified below). This ensures in particular that after the brake has been released, no change in the height of the pick-up unit can take place that could impair, in particular injure, a person using the pick-up device (hereinafter also referred to as "user"). Rather, the pick-up device in accordance with the invention ensures that the pick-up unit is always in balance after the brake is released. After releasing the brake, the user can adjust the pick-up unit to the desired height, in particular by means of the spring force of at least one gas pressure spring.

The forces acting on the pick-up unit, by means of which the measured value determined by the sensor can be changed, can be, in particular, on the one hand the weight force of the pick-up unit and on the other hand the spring force of the gas pressure spring, which counteracts the weight force of the pick-up unit. In this respect, the measured variable can in particular be a measured variable resulting from the force acting on the pick-up unit, in particular in the vertical direction, resulting from the weight of the pick-up unit on the one hand and from the spring force of the gas pressure spring counteracting the weight of the pick-up unit on the other hand. As far as this resulting force is "zero", there is a balance of forces with regard to the weight of the pick-up unit and the spring force of the gas pressure spring counteracting the weight of the pick-up unit, with which the pick-up unit is in balance.

Of particular importance is the inventive aspect that when the brake is locked, such a balance of forces or balance of the pick-up unit can be determined by means of the sensor. In this respect, it was recognised according to the invention that it is necessary to be able to determine the force acting on the pick-up unit, in particular the resulting force acting on the pick-up unit in the vertical direction when the brake is in the first position, i.e. locked. According to the invention, it was recognised that the force acting on the pick-up unit, in particular the resultant force acting on the pick-up unit in the vertical direction, is determined on the one hand by the weight force of the pick-up unit and on the other hand by the spring force of the gas pressure spring which counteracts the weight force of the pick-up unit. If the weight force of the pick-up unit is greater than the spring force of the gas pressure spring counteracting the weight force of the pick-up unit, this results in a "downward" resulting force. If the weight force of the pick-up unit is smaller than the spring force of the gas pressure spring which counteracts the weight force of the pick-up unit, a resulting force "upwards" results. If, however, the weight of the pick-up unit is as high as the spring force of the gas pressure spring counteracting the weight of the pick-up unit, both forces cancel each other out, resulting in a "zero" force. In accordance with the invention, it has now been recognised that this force "upwards" or "downwards", i.e. the force resulting from the weight of the pick-up unit and the spring force of the gas pressure spring counteracting the weight of the pick-up unit, acts against the brake when the brake takes up the first position. In this respect, the brake in the first position locks the pick-up unit against a height adjustment "upwards", if the resulting force is directed "upwards", and against a height adjustment "downwards", if the resulting force is directed "downwards". However, if the resulting force is "zero", in the first position of the brake no force actually acts against the brake resulting from the weight force of the pick-up unit and the spring force of the gas pressure spring acting against it; a resulting force "zero" against the brake in its first position thus indicates a balance of forces or a balance of the pick-up unit. On the basis of this findings in accordance with the invention, it may therefore be preferred to provide that the sensor is capable of determining a measured variable which is influenced by the effect of the force resulting from the weight of the pick-up unit and the spring force of the gas spring counteracting the weight of the pick-up unit on the brake in its first position. In particular, this measured variable can preferably be the force which is exerted by this resulting force on the brake in its first position. If the sensor determines this force as "zero", for example, this indicates a balance of forces or a balance of the pick-up unit. If the sensor otherwise determines this force to be "not equal to zero", for example, this indicates an imbalance of forces or no balance of the pick-up unit.

In principle, the pick-up unit can be of any shape, for example in the form of a tabletop, a workbench, a seat, a bicycle saddle, a bed surface, a tilting window, a loading surface or a television holder. The pick-up device can also be of different shapes, for example as a table frame, workbench frame, seat frame, bicycle, bed frame, window support, vehicle tailgate, loading ramp or television mounting frame. In particular, it may be possible to place the pick-up device on the floor or to attach it to walls, ceilings, cars, parts of buildings or other objects. Preferably, the pick-up device is a piece of furniture, preferably a table, and the pick-up unit is a tabletop, as the latter is often loaded with different objects.

In particular, the pick-up unit has a pick-up surface. The pick-up surface can basically be structured as desired, e.g. flat or profiled. The pick-up surface, especially in the form of a table top, is designed in particular to pick-up various objects, such as books, computer monitors, tools, people, loads or other objects.

Preferably, the pick-up surface is a tabletop, as it is often loaded with different loads.

In particular, a pick-up unit can be vertically adjustable in height, i.e. along a vertical axis. The pick-up unit is particularly preferred to be vertically height-adjustable relative to the floor.

Gas pressure springs are known from the state of the art and can have different shapes and dimensions. The advantages of such a gas pressure spring known from the state of the art are in particular a small space requirement and a spring force which can be made available essentially constantly. The at least one gas pressure spring supports in particular a user in adjusting the height of the pick-up unit by balancing the weight force acting on the pick-up unit so that the pick-up unit and any objects placed on the pick-up surface are in balance. Instead of using at least one gas spring, another pneumatic spring or a hydraulic spring may be used. Several springs can also be arranged in series and/or parallel. In particular, the at least one gas pressure spring can act on the pick-up unit at several points. Intermediate means of power transmission, such as a synchronising axle or a gearbox, are also conceivable.

According to the invention, the pick-up device has a brake, preferably a mechanical brake, to lock the pick-up unit at a certain height or position. The mechanical brake preferably locks by means of frictional locking. The pick-up unit is locked in the first position of the brake. In the second position of the brake, the pick-up unit is adjustable in height. The brake can be designed in accordance with the brakes known from the state of the art for locking pick-up units whose height adjustability is supported by gas pressure springs, and can be designed for the forces to be expected when the pick-up device is used.

Furthermore, the pick-up device is equipped with a sensor which can determine the measured variable which can be changed by forces acting on the mounting unit, even if the brake is locked or takes the first position. The measured variable is such a measured variable which can be changed by the forces acting on the pick-up unit, especially by the weight forces acting on the pick-up unit, and can be determined by the sensor. The measured variable can be any property, in particular a physical property, which can be determined by the sensor as a measured variable, for example electrical properties, distance, position, attitude, angle, force or pressure. The measured variable force is particularly preferred because it can be determined particularly easily and reliably, for example by a sensor in the form of a force sensor (or force transducer).

The control means are set up in such a way that the brake can be transferred from the first position to the second position and vice versa. The control means can basically be any control means known from the state of the art for controlling a brake of a generic pick-up device. For example, the control means may take the form of at least one electrically operated actuator or at least one mechanical system which can be operated by the user. According to the invention, the brake can be controlled by the control means as a function of the measured variable determined by the sensor. Furthermore, it is also conceivable that the control means are present in the form of a mechanical system, for example as mechanically adjustable control means. Such a mechanically adjustable control means can then, for example, only be actuated by the user in dependence on the measured variable which can be determined by the sensor.

According to a particularly preferred embodiment of the invention, the control means are set up in such a way that the brake can only be actuated to take up the second position if the measured variable which can be determined by the sensor corresponds to a certain value or the measured variable lies within a specific value range. This value or value range is advantageously determined, as further explained below, in such a way that the balance of the pick-up unit is indicated. This inventive idea thus ensures that the pick-up unit is in balance when the brake is released or the second position is taken. In this way, an injury of the user can be prevented in case of a release of the brake for a desired height adjustment of the pick-up unit, since in this case the pick-up unit does not automatically adjust itself in height without a height adjustment by the user.

According to a particularly preferred embodiment of the invention, the control means are arranged in such a way that the brake can only be controlled to assume the second position if a control signal (in particular independent of the measured variable) is present. In principle, the control signal can be generated in any way, but preferably depending on a height adjustment of the pick-up device desired by the user. In particular, the control signal may be generated by an action performed by the user. For example, an action performed by the user may generate a control signal, in particular in the form of at least one electrical signal. To generate the control signal, the pick-up device may have means (hereinafter "adjustment means") for generating such a control signal, in particular at least one such adjustment means that can be actuated by a user. Such adjusting means may, for example, take the form of switches, sensors, buttons, capacity sensors or other adjusting means actuated by a user. In particular, the adjusting means may be located on the pick-up unit and generate the control signal when actuated by the user. The advantage of the generation of the control signal by such adjusting means is in particular that the control signal can only be generated when the adjusting means are actuated by the user, so that any height adjustment desired by the user does not have to be continuously detected.

After a further development of this inventive idea, the control means are set up in such a way that the brake can only be controlled to take up the second position if, at the same time, on the one hand, the measured variable which can be determined by the sensor corresponds to a certain value or lies within a certain value range in the measured variable and, on the other hand, the control signal is present. This embodiment has the particular advantage that the pick-up unit can only be adjusted in height if the user wants the pick-up unit to be adjusted in height and at the same time the measured variable determined by the sensor corresponds to a certain value or the measured variable lies within a certain value range. As far as this specific value or value range, as explained in detail below, is advantageously selected in such a way that the balance of the pick-up unit is indicated, this inventive idea ensures that the pick-up unit is always in balance when the user wishes to adjust the height. In this way, an injury of the user can be prevented in case the brake is released for a desired height adjustment of the pick-up unit, since in this case the pick-up unit does not automatically adjust itself in height without a height adjustment by the user. Furthermore, from a safety point of view, it can be advantageous if the control means are set up in such a way that, when the control signal is no longer present, they always move the brake from the second position to the first position.

In a further embodiment of the invention, the pick-up device is designed in such a way that the measured variable which can be determined by the sensor depends on the forces acting on the pick-up unit. If, for example, objects are placed on or removed from the pick-up unit, the weight force exerted by the pick-up unit changes and consequently also the measured variable, in particular also when the brake is locked. It is particularly advantageous that the forces acting on the pick-up unit can be determined directly by the sensor. In this way, a balance of the pick-up unit can be determined without having to compare two measured variables with each other.

In a further embodiment of the invention, the pick-up device is designed in such a way that the measured variable determinable by the sensor depends on the resulting force of at least two forces acting on the pick-up unit. In particular, the measured variable depends on at least two forces acting on the pick-up unit. The weight force of the pick-up unit counteracts the force generated by the at least one gas pressure spring. The pick-up unit is now designed in such a way that the measured variable determined by the sensor represents the force resulting from these counteracting forces. On the basis of this measured variable, a balance of the pick-up unit can be determined. It is also possible, for example, to determine which force is greater in such a state of imbalance in relation to the sensor. A particular advantage is that the measured variable allows direct conclusions to be drawn about the forces acting. In particular, no two sensors are needed to determine the forces acting on the pick-up unit. In addition, the sensor can thus determine the absolute measured variable relative to the acting forces. Thus, no comparison of two absolute values of two sensors is necessary.

In a further embodiment of the invention it is provided that the at least one gas pressure spring provides a spring force acting on the pick-up unit. The spring force can act directly and/or indirectly on the pick-up unit. In particular, it is conceivable that the spring force acts on the pick-up unit at different points in order to advantageously achieve a technically sensible application of force. Furthermore, the spring force can also be transferred to the pick-up unit by means of a synchronisation unit, so that it is advantageous to apply the force evenly at different positions of the pick-up unit. In particular, the spring force counteracts the resulting weight force of the pick-up unit. When the brake is in the first position, the force resulting from the weight of the pick-up unit and the counteracting force of the spring force of the gas spring acts against the brake.

In another particularly preferred embodiment of the invention, it is provided that the spring force of at least one gas pressure spring is changeable. In this way, the spring force can be advantageously adapted to the weight force acting from the pick-up unit, thus creating a balance. The spring force should preferably be changeable in such a way that the at least one gas pressure spring compensates the counteracting weight force of the pick-up unit by the spring force. This makes it possible to exclude the possibility of an uncontrolled lowering or rising of the pick-up unit when the brake is transferred to the second position.

For changing the spring force of at least one gas pressure spring, the skilled person can basically fall back on all measures known from the state of the art. As is known, a gas pressure spring is a pneumatic spring which uses gas under excess pressure to provide a spring force. Gas pressure springs regularly comprise a cylinder in which a pressure gas chamber is formed, a piston that moves in the pressure gas chamber and a gas under excess pressure in the pressure gas chamber which transmits the gas pressure to the piston. The overpressure of the gas determines the force transmitted to the piston and thus the spring force of the gas spring. For example, a change in the spring force can be produced by changing the volume of the gas pressure chamber. For example, another piston can reduce or increase the volume of the chamber in order to reduce or increase the working pressure prevailing in the compressed gas chamber. The spring force of the at least one gas pressure spring changes accordingly. A further possibility for changing the spring force is to change the quantity of compressed gas in the compressed gas chamber of the at least one gas spring. To increase the spring force, for example, gas is then fed into the gas pressure chamber of the at least one gas pressure spring, thus increasing the spring force. To reduce the spring force, for example, gas is then led out of the gas pressure chamber of the at least one gas pressure spring and consequently the spring force is reduced.

In a further particularly preferred embodiment of the invention, it is provided that the spring force can be changed as a function of the measured variable which can be determined by the sensor. In particular, it may be provided that the spring force is variable as a function of the measured variable determined by the sensor. In this way, the spring force can be changed advantageously as a function of the measured variable when the brake is locked, i.e. in the first position, and in particular can be changed in such a way that the spring force in the first position of the brake balances the weight force of the pick-up unit and therefore keeps the pick-up unit in balance when the brake is subsequently released.

In another particularly preferred embodiment of the invention, it is provided that the spring force can only be changed when the brake is in the first position. This means that the spring force can only be changed when the brake is locked or when the pick-up unit is fixed in height. In this way, the safety of operation by the user in particular is increased. In particular, the measured value is determined before the brake is moved to the second position. If a balance is determined on the basis of the measured value, the brake can be transferred to the second position. If no balance can be determined, the brake cannot be transferred to the second position and preferably the spring force is changed to achieve balance.

In another particularly preferred embodiment of the invention, it is provided that the spring force can be changed by adjusting means. The adjusting means are, for example, actuators or other means, in particular also other means operable by a user, by which the spring force of the at least one gas pressure spring is variable. It is advantageous to be able to change the desired spring force directly on the basis of the measured variable by means of the actuating means. In particular, the actuating means can be controlled on the basis of the measured variable determined by the sensor.

In a further particularly preferred embodiment of the invention, it is provided that the control means and/or the actuating means are controllable by an electronic data processing device. In particular, it is provided that the control means and/or the actuating means are controllable by the electronic data processing device (hereinafter also referred to as "EDP") on the basis of the measured variable determinable by the sensor. The EDP can be in the form of a computer or microcontroller, for example. The EDP may include an electronic data memory, the specific value and/or range of values may be stored in the data memory.

Furthermore, it may b provided that the pick-up device is designed in such a way that the measured variable determined by the sensor can be transmitted to the EDP and processed by the EDP. In order to be able to control the control means as a function of the measured variable, the EDP is designed in such a way that the measured variable can be recorded and processed by the EDP and on this basis the actuating and/or control means can be controlled. In particular, the EDP is preferably designed in such a way that the detectable measured variable can be compared with the specific value and/or range of values—in particular those stored in the data memory—and the actuating and/or control means can be controlled on the basis of the result of this comparison. The EDP can be designed in such a way that, on the basis of the result of this comparison, it transmits an actuating signal to the control means, by means of which the latter control the brake to take up the first or the second position. In this respect, in accordance with a particularly preferred embodiment of the invention, the EDP is designed in such a way that it only transmits an actuating signal to the control means for controlling the actuating means to take the second position of the brake if, on the basis of the result of this comparison, the measured variable corresponds to the specific value and/or lies within the specific value range.

Accordingly, with regard to the control signal, it may be provided that the pick-up device is designed in such a way that the generated control signal can be transmitted to the EDP and processed by the EDP. In order to be able to control the control means depending on the control signal, the EDP is designed in such a way that the control signal can be detected and processed by the EDP and on this basis the adjusting and/or control means can be controlled. The EDP can be designed in such a way that, on the basis of the control signal, it transmits an actuating signal to the control means, by means of which the latter control the brake to take up the first or the second position.

According to a preferred further development of this inventive idea, it is provided that the control means are set up in such a way that the brake is only actuated to take up the second position if, on the one hand, the measured variable which can be determined by the sensor corresponds to a certain value or lies within a certain value range in the measured variable and, on the other hand, the control signal is simultaneously present. In this way it can be ensured in the case of a height adjustment that the brake can only be transferred to the second position by the control means if the pick-up device is in balance and, in particular, the user wishes to adjust the height at the same time. In this way the safety of the user of the pick-up device can be further increased.

In this respect, in accordance with a particularly preferred embodiment of the invention, the EDP is designed in such a way that it only transmits an actuating signal to the control means for controlling the actuating means for taking up the second position of the brake if the EDP has determined (after a comparison of the measured variable with the determined value and/or range of values) that the measured variable corresponds to the determined value and/or lies within the determined range of values and, furthermore, the control signal (generated by the actuating means) is simultaneously transmitted to the control means.

Further features of the invention result from the claims, the exemplary embodiment of the invention shown in the figures as well as the corresponding figure description.

All features of the invention can be, individually or in combination, can be combined with each other as desired.

Figure 2:
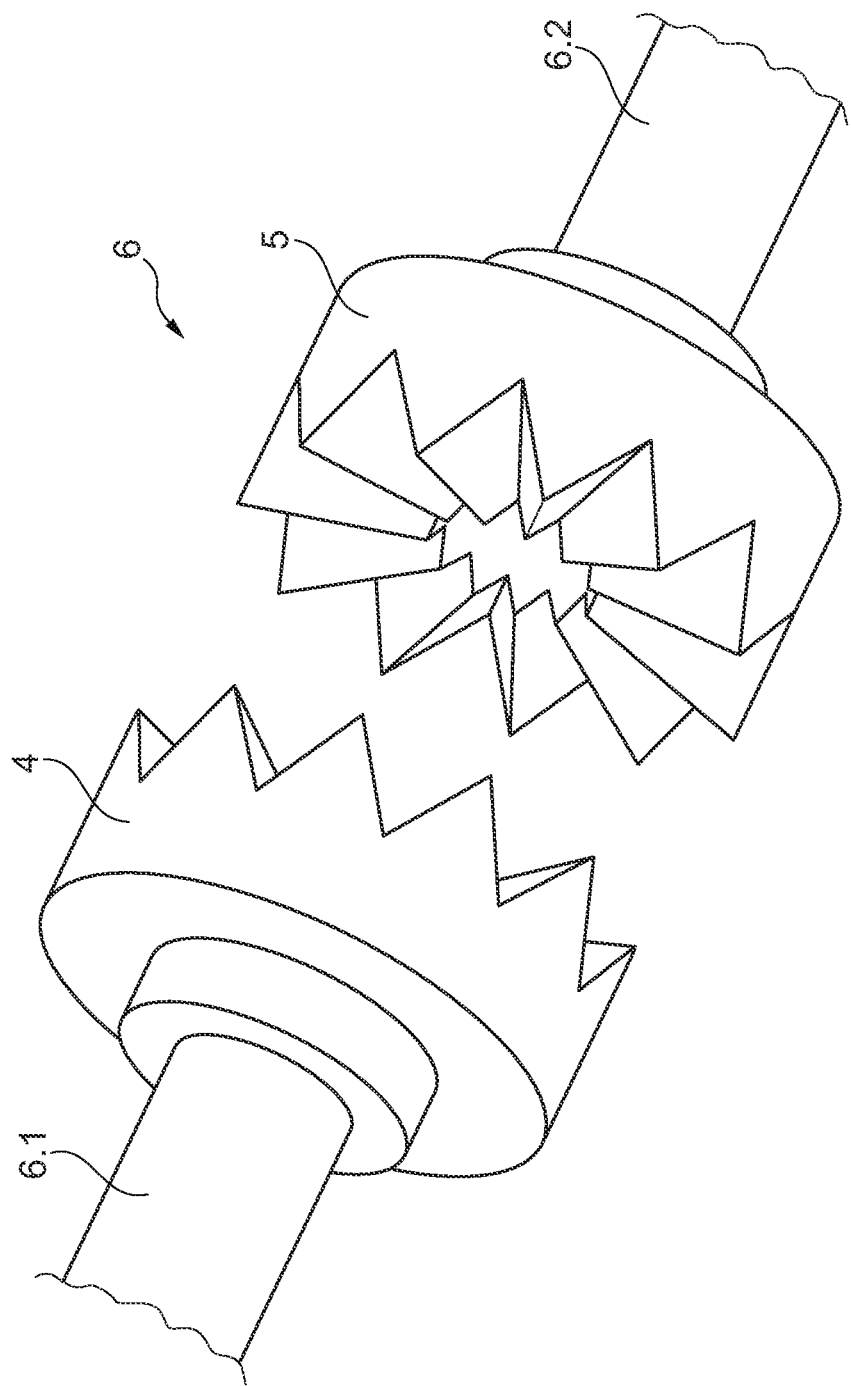

In the figures schematically shows:

FIG. 1 an example of an inventive pick up device,

FIG. 2 an example of a brake

FIG. 3 a side view of the brake as shown in FIG. 2 in the second position, and

FIG. 4 a side view of the brake according to FIG. 2 in the first position with an exemplary embodiment of the sensor.

FIG. 1, an exemplary embodiment of the pick-up device 1 according to the invention is illustrated, which is marked in its entirety with the reference sign 1. The pick-up device 1 is exemplarily designed in the form of a table. The pick-up device 1 has a height-adjustable pick-up unit 2 in the form of a height-adjustable table top 2.

The pick-up unit 2 is positioned on a base 9 via two table legs 7, 8. On the underside, the table legs 7, 8 each have a foot plate 10, 11, over which the table legs are positioned on the base 9 so that they cannot tip over.

The table leg 7 (right-hand side in FIG. 1) is designed as a gas pressure spring 7 and comprises a cylinder 7.1 fixed to the foot plate 11, which defines a compressed gas chamber formed in the cylinder 7.1, and a piston 7.2 arranged vertically movable in the cylinder 7.1. In this respect the gas pressure spring 7 corresponds to a gas pressure spring known from the state of the art for height adjustment of furniture.

The (in FIG. 1 left) table leg 8 is telescopic and comprises a sleeve 8.1 fixed to the foot plate 10, in which a vertically movable sleeve 8.2 is arranged.

The pick-up unit 2, designed as a table top, is connected on the underside with the upper end of the sleeve 8.2 of the table leg 8 and with the upper end of the piston 7.2 of the gas pressure spring 7. In this respect the pick-up unit 2 is height-adjustable over the two table legs 7, 8 on the base 9.

To lock the height adjustability of the pick-up unit 2 the pick-up device is equipped with a brake 6. The brake 6 comprises a first, rod-shaped section 6.1, which is attached to the sleeve 8.1 and extends along a longitudinal axis L in the direction of the cylinder 7.1 of the gas pressure spring 7 towards it.

The first section 6.1 of the brake 6 is rotationally fixed to the longitudinal axis L and longitudinally displaceable along the longitudinal axis L, indicated by the double arrow P, arranged on the sleeve 8.1. The brake 6 further comprises a second, rod-shaped section 6.2, which is attached to the cylinder 7.1 and extends along the longitudinal axis L towards the sleeve 8.1. The second section 6.2 of the brake 6 is arranged rotatably around the longitudinal axis L and not longitudinally displaceable along the longitudinal axis L towards the cylinder 7.1. The second section 6.2 is connected to piston 7.2 of the gas spring 7 via a gear 12. The gear 12 is designed in such a way that a vertical movement of the piston 7.2 causes a rotational movement of the second section 6.2 around the longitudinal axis L, respectively a rotational movement of the second section 6.2 around the longitudinal axis L causes a vertical movement of the piston 7.2. Accordingly, the vertical movement of the piston 7.2 is arrested when the rotational movement of the second section 6.2 about the longitudinal axis L is arrested. Gear unit 12 can, for example, be designed as a rack and pinion drive (not shown), whereby a pinion formed on the second section 6.2, which can be rotated about the longitudinal axis L and is arranged to be non-rotatable relative to the second section 6.2, engages in a rack formed on the piston 7.2.

The first section 6.1 has first engagement means 4 at its end facing the second section 6.2 and the second section 6.2 has second engagement means 5 at its end facing the first section 6.1. The first and second engagement means 4, 5 are dimensioned in such a way that the first engagement means 4 can engage in the second engagement means 5 in such a way that a rotary movement of the second section 6.2 about the longitudinal axis L is not possible. The pick-up device 1 comprises a control means in the form of an electrically drivable actuator 13, via which the first section 6.1 of the brake 6 can be displaced along the longitudinal axis L. The first section 6.1 of the brake 6 can be displaced by the actuator 13 along the longitudinal axis L into a first position in which the first engagement means 4 engage with the second engagement means 5 in such a way that a rotational movement of the second section 6.2 about the longitudinal axis L is not possible. Furthermore, the first section 6.1 of the brake 6 can be displaced along the longitudinal axis L by the actuator 13 into a second position in which the first engagement means 4 do not engage the second engagement means 5, so that a rotational movement of the second section 6.2 about the longitudinal axis L is possible.

On the brake 6, a sensor 27 in the form of a pressure sensor is arranged on the first engagement means 4 in such a way that a measured variable in the form of a force can be measured by the first engagement means 4, the magnitude of which corresponds to the force which the second engagement means 5 exert on the first engagement means 4.

The pick-up device 1 has an adjusting means 15 for changing the spring force of the gas pressure spring 7. For the sake of clarity, the adjusting means 15 are shown between the two table legs 7, 8. Preferably, however, the adjusting means 15 are installed in table 1. In the exemplary embodiment, this adjusting means 15 comprises a gas tank 16 filled with gas, which is connected to the gas pressure chamber in cylinder 7.1 of the gas spring 7 via guiding elements in the form of two fluid carrying hoses 17, 18. The hose 18 can be shut off via a valve 20. The hose 17 is connected to a fan 19, which can be used to convey gas through the hose 19. The gas in the gas tank 16 is preferably always under a higher pressure than the pressure acting on the gas in cylinder 7.1. To increase the spring force of the gas pressure spring 7, gas (with the fan 19 switched off) is fed from the gas tank 16 through the hose 18 into the gas pressure chamber of cylinder 7.1 by opening the valve 20. Consequently, the pressure in the gas pressure chamber increases the spring force provided by the gas spring 7. In order to reduce the spring force, gas is led (with the valve 20 closed) from the compressed gas chamber through the hose 17 into the gas tank 10 by operating the fan 19. As a result, the pressure prevailing in the pressurised gas chamber is reduced and thus also the spring force provided by the gas spring 7. The gas tank 16, the guiding means (fluid carrying hoses 17, 18), the valve 12 and the compressor 13 form the adjusting means 15.

The pick-up device 1 also includes actuating means 21, 22 for generating a control signal. The actuating means 21, 22 are provided by two capacity sensors arranged below the pick-up unit 2 and spaced apart from each other. A control signal is generated when both capacity sensors 21, 22 are touched simultaneously by a user of the pick-up unit.

An object 23 in the form of a computer monitor is placed on the pick-up unit 2. The weight force exerted by the pick-up unit 2 is essentially determined by the weight force of the pick-up unit 2 itself, the computer monitor 23 and the other elements arranged on the pick-up unit 2, in particular the adjusting means 21, 22 as well as the elements for connecting the pick-up unit 2 with the piston 7.2 and the sleeve 8.2.

The pick-up device 1 also includes an electronic data processing device (EDP) 24 in the form of a microcontroller. The EDP 24 comprises an electronic data memory 25 and a processor 26. A certain range of values is stored in the data memory 25. For the sake of clarity, the EDP 24 is arranged next to the table 1. However, EDP 24 is preferably installed in table 1.

The EDP 24 is connected to the sensor 27 via a data cable 28. Via the data cable 28, a measured variable determined by sensor 27, i.e. the magnitude of a force, can be transmitted to EDP 24 in the form of an electrical signal.

The EDP 24 is also connected to the actuator 13 via a data cable 29. A control signal can be transmitted to the actuator 13 via the data cable 21, which causes the actuator 13 to move the first section 6.1 of the brake 6 along the longitudinal axis L to the first position (in which the first engagement means 4 engage with the second engagement means 5 in such a way that a rotational movement of the second section 6.2 about the longitudinal axis L is not possible) or to the second position (in which the first engagement means 4 do not engage with the second engagement means 5).

Furthermore, the EDP 24 is connected to the adjusting means 21, 22 via a data cable 30 in such a way that a control signal generated by a user by simultaneously touching the adjusting means 21, 22 can be transmitted to the EDP 24 via the data cable 29.

The EDP 24 is connected to the valve 20 via a data cable 31 in such a way that the EDP 24 can transmit a control signal to the valve 20 to open or close it.

Finally, the EDP 24 is connected to the fan 19 via a data cable 31 in such a way that the EDP 24 can transmit a control signal to the fan 19 to start or stop it.

The EDP 24 is designed in such a way that it can process the signal received from sensor 27 via data cable 28 and the control signal received via data cable 30 by means of processor 26. Furthermore, the EDP is designed in such a way that the EDP 24 can compare the signal received from sensor 27 with the value range stored in data memory 25. Furthermore, the EDP 24 is designed in such a way that it can (as described below) control the valve 20 via the data cable 32 and the fan 19 via the data cable 31 depending on this comparison. Finally, the EDP 24 is designed in such a way that it can (as described below) transmit a control signal to the actuator 13 as a function of this comparison and the control signal.

When operating the pick-up unit 1, different load conditions occur and the height adjustment of the pick-up unit 2 is accordingly different.

In the first case, the pick-up unit 2 is in balance and there is no computer monitor 23 on pick-up unit 2. The weight force of the mounting unit 2 counteracting the spring force of the gas pressure spring 7 and the spring force are balanced. The brake 6 is in the first position and the first section 6.1 and the second section 6.2 are connected via the engagement means 4, 5.

If the user now wishes to adjust the height of the pick-up unit 2, he first touches the capacity sensors 21, 22. A control signal is then generated and transmitted to EDP 24 via data cable 30. The EDP 24 also receives the measured variable currently determined by sensor 27 in the form of the signal via data cable 28 and processes the signal in processor 26. Processing the signal means in particular comparing the measured variable corresponding to the signal measured by sensor 27 with the value range stored in data memory 25 of the EDP 24. The EDP 24 checks whether the value of the measured variable is within the value range stored in the data memory 25. In the present case the pick-up unit 2 is in balance and the value of the measured variable is therefore within the value range stored in data memory 25. The EDP 24 can therefore now determine that the pick-up unit 2 is in balance. At the same time, the control signal is transmitted to EDP 24. Since the EDP 24 determines that the pick-up unit 2 is in balance and the control signal is present at the same time, the EDP 24 transmits a control signal via the data cable 29 to the actuator 13 to move the brake 6 to the second position. In doing so, the actuator 13 shifts the first section 6.1 along the longitudinal axis L (to the left in FIG. 1) so that the engagement means 4 is "pulled" out of the engagement means 5, i.e. the engagement means 4, 5 no longer engage with each other and the first section is thus in the second position. The second section 6.2 is now no longer locked and a rotational movement of the second section 6.2 around the longitudinal axis L is possible. The second section 6.2, which is connected to piston 7.2 of gas spring 7, now rotates around the longitudinal axis L during a vertical movement of piston 7.2. The gear 12 determines the rotary movement. The user can now adjust the balanced mounting unit 2 to a desired height. In the second position of the first section 6.1 the brake 6 is now in the second position. The vertically movable sleeve 8.2 moves accordingly during the height adjustment in the fixed sleeve 8.1. To adjust the height of the pick-up unit 2, the user must therefore only apply the necessary acceleration forces upwards or downwards, as the weight force is balanced by the spring force of the gas pressure spring 7. The height adjustment of pick-up unit 2 is therefore extremely easy for the user and can be carried out with little effort.

At the desired height, the user releases the pick-up unit 2 or the capacity sensors 21, 22. As a result, the control signal is no longer generated and is transmitted to the EDP 24 via the data cable 30. As a result, the EDV 24 controls the actuator 13 for transferring the brake 6 to the first position via the data cable 29, as no control signal is generated (due to the faulty adjustment signal). To do this, section 6.2 is moved by actuator 13 along the longitudinal axis L (to the right in FIG. 1) to the first position, so that the first engagement means 4 of the first section 6.1 and the second engagement means 5 of the second section 6.2 interlock. Consequently, a rotational movement around the longitudinal axis L of the second section 6.2 is no longer possible and the pick-up unit 2 is locked at the desired height by the brake 6.

Starting from the first case described, a second case is described in which the computer monitor 13 is placed on the pick-up unit 2 and thus no balance is achieved due to the added weight.

The brake 6 is still in the first position and locks the pick-up unit 2 at a certain height. In this case the weight of the pick-up unit 2 and the spring force of the gas pressure spring 7 do not balance each other. In fact, the weight force which counteracts the spring force is greater by the weight of the computer monitor 23.

If the user now wishes to adjust the height of the pick-up unit 2, he first touches the capacity sensors 21, 22. A control signal is then generated and transmitted to the EDP 24 via the data cable 30. The EDP 24 now receives the measured variable currently determined by sensor 27 in the form of the signal via data cable 28 and processes the signal in processor 26. Processing the signal means in particular comparing the signal corresponding to the measured variable measured by sensor 27 to see whether it lies within the value range stored in data memory 25. In the case described, the pick-up unit 2 is not in balance, so that the measured variable determined by sensor 27 generates a signal that lies outside the value range stored in data memory 25. In this way, EDP 24 can now determine that the pick-up unit 2 is not in balance. For this reason, EDV 24 initially does not send a control signal to the actuator 13 to transfer brake 6 to the second position.

On the basis of a comparison of the measured value with the range of values stored in memory 25, EDP 24 can determine whether the spring force of the gas spring 7 opposing the weight force is smaller or larger than the weight force. If the measured value is above the value range, the spring force of the gas spring 7 is smaller than the weight force. If the measured variable is below the value range, the spring force of the gas spring is greater than the weight force opposing it. In the present case, the spring force is too low to compensate for the weight force because the computer monitor 23 is switched off. The measured value is therefore above the value range.

The EDP 24 therefore sends a signal via the data cable 32 to open the valve 20 until the spring force compensates the counteracting weight force, the pick-up unit 2 is thus in balance and the measured value determined by the sensor 27 accordingly generates a signal which lies within the value range stored in the data memory 25. The EDP 24 then controls the valve 20 to close.

Furthermore, the adjustment signal is present when the user touches the capacity sensors 21, 22 and the EDP 24 determines that the pick-up unit 2 is in balance on the basis of the signal transmitted by sensor 27. Thus, the same conditions as in the first case described above are present, so that the brake 6 is moved to the second position and a height adjustment of the pick-up unit 2 can be carried out by the user as in the first case described above.

Based on the second case described above, a third case is now described in which the computer monitor 23 is removed from the pick-up unit 2 and thus no balance is achieved due to the weight no longer being present.

The brake 6 is in the first position and locks the pick-up unit 2 at a certain height. In this case the weight of the mounting unit 2 and the spring force of the gas pressure spring 7 do not balance each other. In fact, the amount of the weight force which counteracts the spring force is smaller by the weight of the computer monitor 23.

If the user now wishes to adjust the height of pick-up unit 2, he first touches the capacity sensors 21, 22. A control signal is then generated and transmitted to EDP 24 via data cable 30. The EDP 24 now receives the signal from sensor 27, which corresponds to the measured value currently transmitted by sensor 27, via data cable 28 and processes the signal in processor 26. Processing the signal again means comparing the signal with the value range stored in data memory 25 as described above. In the case described, the pick-up unit 2 is not in balance and the strength of the signal therefore corresponds to a value that lies outside the value range stored in data memory 25. In this case, EDP 24 can now determine that the pick-up unit 2 is not in balance. For this reason, EDP 24 initially does not control the brake to move brake 6 to the second position.

Again, as mentioned above, the EDP 24 can determine whether the spring force of the gas pressure spring 7 opposing the weight force is smaller or larger than the weight force on the basis of a comparison of the height signal, which in turn corresponds to the height of the measured variable, with the range of values stored in memory 25. In the present case the spring force is too large to compensate the weight force by removing the computer monitor 23. The measured value is therefore below the value range.

EDP 24 now controls fan 19 until the measured value determined by sensor lies within the value range stored in data memory 25. By activating the fan 19, gas from the compressed gas chamber of the compressed gas spring 7 is led via the hose 17 into the gas tank 16. Consequently, the spring force decreases as the quantity of compressed gas in the compressed gas chamber decreases. If the measured quantity determined by sensor 27 is within the value range, the EDP 24 no longer controls the fan. The spring force and the counteracting weight force are thus balanced out again.

Furthermore, the adjustment signal is present when the user touches the capacity sensors 21, 22 and the EDP 24 determines on the basis of the current measured variable determined by sensor 27 that the pick-up unit 2 is in balance. Thus, the same conditions as in the first case described above are present. The spring force of the gas pressure spring 7 was adapted to the weight force. A height adjustment of the pick-up unit 2 can now be carried out by the user as described above.

Furthermore, the pick-up unit 1 is designed in such a way that an adjustment of the spring force to the weight force is carried out continuously or at intervals and independently of the control signal. The sensor 27, for example, determines the current measured variable at defined intervals and transmits this in the form of a signal via the data cable 28 to the EDP 24. If the measured variable determined in this way lies outside the value range stored in the data memory 25, the EDP 24 controls the control means 19, 20 until the measured variable lies within the value range. The EDP 24 can therefore adjust the spring force without an adjustment signal when the pick-up unit 2 is locked. If the user then indicates a height adjustment of the pick-up unit 2 by touching the capacity sensors 21, 22, brake 6 can be transferred advantageously quickly without having to adapt the spring force to the weight force. Before releasing brake 6, however, EDP 24 always checks whether the measured value determined by sensor 27 is within the value range.

In the detailed view of FIG. 2 and in the side view of FIG. 3 a possible design of brake 6 in the second position is shown. The engagement devices 4, 5 do not touch each other in the second position, so that the pick-up unit 2 is adjustable in height. Section 6.1 of brake 6 can be moved along the axis P. Section 6.2 of brake 6 cannot be moved along the P axis. The design of the engagement means 4, 5 of the brake 6 allows different engagement positions in the direction of rotation around the P axis, so that the engagement means 4, 5 can engage in different positions.

FIG. 4 shows the brake 6 in the first position, where the engagement means 4, 5 interlock and lock the pick-up unit 2 at a certain height. In doing so, the engagement means 4 absorbs the torque acting on the engagement means 5 along the axis P. Since the engaging means 4 is mounted in a torsionally rigid manner and can only be moved along the axis P, the brake 6 locks the pick-up unit 2 in the first position. In doing so, the brake 6 can absorb both positive and negative torques, depending on the spring force and the total weight force.

Furthermore, FIG. 4 shows a detailed view A of the engagement areas in the second position. Here a sensor 27 in the form of a pressure sensor can be seen on the engagement means 5. In the state shown in detail view A, the pick-up device 1 or pick-up unit 2 is in balance. The engagement means 4, 5 are not rotated against each other by a torque acting on the engagement means 5. Rather, the engagement means 4, 5 have a small distance between them. The sensor 27 measures a value which corresponds to the specific value or is within the specific value range. The brake 6 can thus be transferred to the second position and thus the pick-up unit 2 can be adjusted in height. The value measured by the sensor 27 is transmitted to the EDP 24 and depending on the value, the control means 13 is activated.

If a force imbalance were to arise between the total weight force and the counteracting spring force, the force at sensor 27 could be measured by the torque acting on the engagement means 5. Brake 6 would then still ensure the locking of the pick-up unit 2 and would then not be able to be transferred to the second position until the value measured by sensor 27 corresponds to the specific value or lies within the specific value range.

Alternatively, the sensor 27 could be attached to one of the engagement means 4, 5 in such a way that the sensor 27 can detect a positive and a negative torque acting on the engagement means 5. It is also conceivable to attach a sensor 27, which can measure a value at several points in the direction of rotation. In particular, it is also conceivable that the value measured by sensor 27 can also be used to determine a force quantity of the torque, preferably by EDP 24. On the basis of the value measured by sensor 27, the force quantity and the direction of rotation of the force imbalance in which the pick-up unit 2 is located can thus be determined. Consequently, the pick-up unit 2 can then be brought back into balance by means of the actuating means 15.

In principle, sensor 27 can be any measuring device capable of measuring a force acting on a part of the brake 6 (in particular a torque acting on the engagement means 5) as a physical quantity. The physical quantity is suitable for determining the effective force ratio in the pick-up device 1 or at the brake 6 when the brake 6 is in the first position. Preferably, the physical quantity or the value determined by the sensor 27 can also be used to determine the direction of rotation as well as the force quantity of the force imbalance, so that a balance can be established on this basis by the adjusting means 15. In particular, the sensor 27 can also be a torque sensor or a 3D magnetic sensor. A torque sensor is then, for example, arranged on the axis of rotation of the engagement means 4, 5. It is also possible to use a sensor 27 which measures a relative movement between the engagement means 4, 5 in order to detect an imbalance of forces. Furthermore, the use of an optical sensor is also conceivable, which determines the position of the engagement means 4, 5 in relation to each other, in particular in order to be able to draw conclusions about the balance of forces.

The invention claimed is:
1. A pick-up device (1) comprising:
   1.1 a height-adjustable pick-up unit (2);
   1.2 at least one gas pressure spring (7) which is designed to compensate for forces acting on the pick-up unit (2);
   1.3 a brake (6) which is designed to take up a first position and a second position, wherein
      1.3.1 the brake (6) in the first position locks the pick-up unit (2) in such a way that the pick-up unit is not height-adjustable, and
      1.3.2 the brake (6) in the second position does not lock the pick-up unit (2), so that the pick-up unit (2) is adjustable in height;
   1.4 a sensor (27) by means of which a measured variable can be determined which can be changed by forces acting on the pick-up unit (2) when the brake (6) takes up the first position; and
   1.5 control means (13) by means of which the brake (6) can be actuated to take up the first position or the second position, the control means (13) being set up in such a way that the brake (6) can be actuated by the control means (13) as a function of the measured variable which can be determined by the sensor (27).

2. Pick-up device (1) according to claim 1, wherein the control means (13) are set up in such a way that the brake (6) can only be actuated to take up the second position if the measured variable which can be determined by the sensor (27) corresponds to a specific value or the measured variable lies within a specific value range.

3. Pick-up device (1) according to claim 2, wherein the control means (13) are set up in such a way that the brake (6) can only be actuated to take up the second position if a control signal is present.

4. Pick-up device (1) according to claim 3, wherein the control means (13) are set up in such a way that the brake (6) can only be actuated to take up the second position if at the same time the measured variable which can be determined by the sensor (27) corresponds to a specific value or lies within a specific value range in the measured variable and the control signal is present.

5. Pick-up device (1) according to claim 1, which is designed in such a way that the measured variable which can be determined by the sensor (27) depends on the forces acting on the pick-up unit (2).

6. Pick-up device (1) according to claim 1, which is designed in such a way that the measured variable which can be determined by the sensor (27) depends on the resulting force of at least two forces acting on the pick-up unit (2).

7. Pick-up device (1) according to claim 1, wherein the at least one gas pressure spring (7) provides a spring force acting on the pick-up unit (2).

8. Pick-up device (1) according to claim 7, wherein the spring force is changeable.

9. Pick-up device (1) according to claim 7, wherein the spring force is changeable as a function of the measured variable which can be determined by the sensor (27).

10. Pick-up device (1) according to claim 7, wherein the spring force can only be changed when the brake (6) takes up the first position.

11. Pick-up device (1) according to claim 7, wherein the spring force can be changed by adjusting means (15).

12. Pick-up device (1) according to claim 11, wherein the spring force can be changed by the adjusting means (15) as a function of the measured variable which can be determined by the sensor (27).

13. Pick-up device (1) according to claim 11, wherein the control means (13) and/or the adjusting means (15) is controlled by an electronic data processing device (24).

14. A method for controlling a brake (6) acting on a height-adjustable pick-up unit (2) of a pick-up device (1), comprising the following features:
   14.1 providing a pick-up device (1) according to claim 1;
   14.2 activating of the brake (6) by the control means (13).

15. Method according to claim 14, wherein the control means (13) are set up in such a way that the brake (6) is only controlled to take the second position when
   15.1 the measurable variable which can be determined by the sensor (27) corresponds to a certain value or lies within a certain value range, and
   15.2 the control signal is present.

16. The pick-up device (1) according to claim 1, wherein the forces acting on the pick-up unit (2) include a first force caused by the at least one gas pressure spring and a second force caused by weight of the pick-up unit and items placed thereon.

17. The pick-up device (1) according to claim 1, wherein the brake (6) is configured to remain in the first position while the forces acting on the pick-up unit (2) are changed.

* * * * *